(12) United States Patent
Suzuki et al.

(10) Patent No.: US 11,331,570 B2
(45) Date of Patent: May 17, 2022

(54) GAME SYSTEM, STORAGE MEDIUM HAVING STORED THEREIN GAME PROGRAM, INFORMATION PROCESSING APPARATUS, AND GAME PROCESSING METHOD

(71) Applicant: NINTENDO CO., LTD., Kyoto (JP)

(72) Inventors: Toshiaki Suzuki, Kyoto (JP); Misaki Hiraga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/023,757

(22) Filed: Sep. 17, 2020

(65) Prior Publication Data
US 2021/0252393 A1  Aug. 19, 2021

(30) Foreign Application Priority Data
Feb. 13, 2020  (JP) .............................. JP2020-022720

(51) Int. Cl.
*A63F 13/285* (2014.01)
*A63F 13/211* (2014.01)
(Continued)

(52) U.S. Cl.
CPC .......... *A63F 13/285* (2014.09); *A63F 13/211* (2014.09); *A63F 13/23* (2014.09);
(Continued)

(58) Field of Classification Search
CPC .............................. A63F 13/211; A63F 13/285
See application file for complete search history.

(56) References Cited

U.S. PATENT DOCUMENTS

| 11,013,991 B1* | 5/2021 | Seibert | A63F 13/92 |
| 2016/0041622 A1* | 2/2016 | Mattice | G07F 17/32 463/37 |

(Continued)

FOREIGN PATENT DOCUMENTS

| JP | 2013-81572 A | 5/2013 |
| JP | 2018-108297 | 7/2018 |

(Continued)

OTHER PUBLICATIONS

Japanese Office Action issued in Japanese Application No. 2020-022720 dated Mar. 24, 2022 (see global dossier).

*Primary Examiner* — Jay Trent Liddle
(74) *Attorney, Agent, or Firm* — Nixon & Vanderhye P.C.

(57) ABSTRACT

An example of an operation device includes an inertial sensor and a vibrator, transmits inertia data based on an output of the inertial sensor to an information processing apparatus, and vibrates the vibrator based on a vibration control signal received from the information processing apparatus. One or more processors of the information processing apparatus execute game processing, and in a predetermined situation in the game processing, cause the vibration control signal for vibrating the vibrator to be output from the information processing apparatus. The one or more processors, based on the inertia data from the operation device, determine whether or not the operation device is moving, and at least under the condition that it is determined that the operation device is not moving, limit the vibration so that the vibrator of the operation device is not vibrated or the vibration is weakened in the predetermined situation.

24 Claims, 13 Drawing Sheets

(51) Int. Cl.
*A63F 13/23* (2014.01)
*A63F 13/24* (2014.01)
*A63F 13/2145* (2014.01)
*A63F 13/54* (2014.01)

(52) U.S. Cl.
CPC ........... *A63F 13/2145* (2014.09); *A63F 13/24* (2014.09); *A63F 13/54* (2014.09); *A63F 2300/105* (2013.01); *A63F 2300/1025* (2013.01); *A63F 2300/1037* (2013.01); *A63F 2300/1043* (2013.01); *A63F 2300/1075* (2013.01); *A63F 2300/6081* (2013.01)

(56) References Cited

U.S. PATENT DOCUMENTS

| | | | |
|---|---|---|---|
| 2016/0354688 A1* | 12/2016 | Harkham | G07F 17/3276 |
| 2018/0185752 A1 | 7/2018 | Kakinuma et al. | |
| 2019/0143205 A1 | 5/2019 | Takahashi et al. | |
| 2019/0258328 A1* | 8/2019 | Venkatesan | G06F 3/016 |
| 2019/0344163 A1* | 11/2019 | Imada | A63F 13/211 |
| 2020/0061459 A1* | 2/2020 | Nakagawa | G06F 3/01 |
| 2020/0061461 A1* | 2/2020 | Mahlmeister | A63F 13/285 |
| 2020/0282310 A1* | 9/2020 | Nakagawa | A63F 13/23 |
| 2021/0191517 A1* | 6/2021 | Yamano | A63F 13/212 |
| 2021/0236921 A1* | 8/2021 | Seibert | A63F 13/285 |

FOREIGN PATENT DOCUMENTS

| | | |
|---|---|---|
| JP | 2019-84298 A | 6/2019 |
| WO | 2018/003161 | 1/2018 |

\* cited by examiner

Fig.9

| STATE OF MOTION | CANCELLATION CONDITION | VIBRATION CONTROL |
|---|---|---|
| MOVING STATE | — | PERMIT |
| STOPPED STATE | NOT SATISFY | LIMIT |
| | ATTACHED TO MAIN BODY APPARATUS | CANCEL LIMITATION |
| | INPUT IS PROVIDED | |
| | NOT IN PLACEMENT ORIENTATION | |

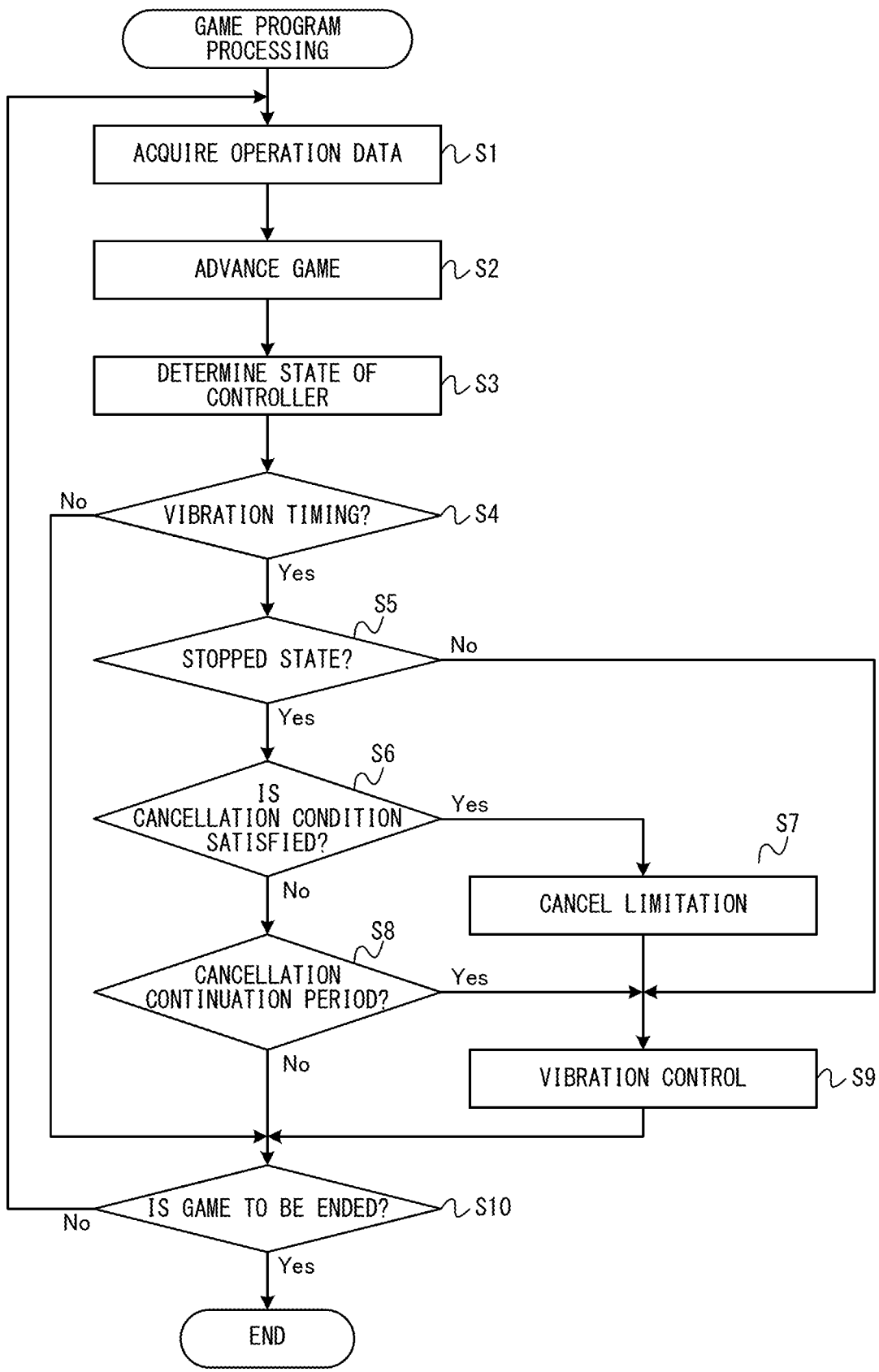

GAME SYSTEM, STORAGE MEDIUM HAVING STORED THEREIN GAME PROGRAM, INFORMATION PROCESSING APPARATUS, AND GAME PROCESSING METHOD

CROSS REFERENCE TO RELATED APPLICATION

This application claims priority to Japanese Patent Application No. 2020-22720 filed on Feb. 13, 2020, the entire contents of which are incorporated herein by reference.

FIELD

The present disclosure relates to a game system, a storage medium having stored therein a game program, an information processing apparatus, and a game processing method that control the vibration of an operation device.

BACKGROUND AND SUMMARY

Conventionally, in a game, the vibration of an operation device including a vibrator is controlled.

During a game, a player is not always holding an operation device, and the player may temporarily place the operation device on a table, a floor, or the like during the game. Here, if the operation device is placed on a table, a floor, or the like, a loud sound may be produced due to the vibration of the operation device depending on the location where the operation device is placed. If a vibration is thus generated in the operation device in a case where the operation device is not being held, a disadvantage may occur due to the vibration.

Therefore, the present application discloses a game system, a storage medium, an information processing apparatus, and a game processing method that are capable of reducing the possibility of the occurrence of a disadvantage due to the vibration of an operation device.

(1) An example of a game system described in the present specification comprises: an information processing apparatus; and at least one operation device. The information processing apparatus includes one or more processors. The operation device includes an inertial sensor and a vibrator and is configured to: transmit inertia data based on an output of the inertial sensor to the information processing apparatus; and vibrate the vibrator based on a vibration control signal received from the information processing apparatus. The one or more processors are configured to: execute game processing; in a predetermined situation in the game processing, cause the vibration control signal for vibrating the vibrator of the specified operation device to be output from the information processing apparatus; based on the inertia data from the operation device, determine whether or not the operation device is moving; and at least under the condition that it is determined that the operation device is not moving, limit the vibration so that the vibrator of the operation device is not vibrated or the vibration is weakened in the predetermined situation.

According to the configuration of the above (1), if it is determined that an operation device is not moving, the vibration of a vibrator is limited so that the vibrator does vibrate or the vibration is weakened. Consequently, it is possible to reduce the possibility of the occurrence of a disadvantage that in a case where an operation device is placed on a table, a floor, or the like, a loud sound is produced due to a vibration.

(2) The inertial sensor may include at least an acceleration sensor. If a magnitude of a change in an acceleration detected by the acceleration sensor in a predetermined period is smaller than a reference, the one or more processors may determine that the operation device is not moving.

According to the configuration of the above (2), if the operation device is substantially stopped, it is possible to limit the vibration of the operation device. Thus, it is possible to effectively limit a vibration.

(3) The one or more processors may, based on the inertia data based on the output of the inertial sensor included in the operation device, determine whether or not an orientation of the operation device satisfies a cancellation condition. If the cancellation condition is satisfied, the one or more processors may cancel the limitation of the vibration.

(4) The operation device may further include an operation button and/or a direction input stick. If an input is provided to the operation button and/or the direction input stick, the one or more processors may further cancel the limitation of the vibration.

(5) The operation device may be attachable to the information processing apparatus. If the operation device is in a state where the operation device is attached to the information processing apparatus, the one or more processors may further cancel the limitation of the vibration.

According to any of the configurations of the above (3) to (5), even if it is determined that the operation device is not moving, but if it is presumed that it is likely that a player is holding the operation device, the limitation of the vibration is cancelled. Based on this, it is possible to reduce the possibility that in a case where an operation device is actually being held by a player, the vibration of the operation device is limited.

(6) The one or more processors may execute a game where a plurality of players perform game operations in order in the game processing. In a situation where a player has a turn performing a game operation, at least under the condition that it is determined that the operation device corresponding to the player is moving, the one or more processors may cause the vibration control signal for vibrating the vibrator of the operation device to be output from the information processing apparatus, and at least under the condition that it is determined that the operation device is not moving, limit the vibration.

According to the configuration of the above (6), during a game in which a plurality of players participate, if a player having a turn performing an operation is holding an operation device, it is possible to give a notification to the player by a vibration, and if the player is not holding the operation device, it is possible to reduce the possibility of the occurrence of a disadvantage due to a vibration.

The present specification discloses examples of an information processing apparatus in the above (1) to (6) and a storage medium having stored therein a game program for causing a computer (or a processor) of the information processing apparatus to execute processing in the above (1) to (6). Further, the present specification discloses an example of a game processing method executed in a game system in the above (1) to (6).

Further, the present specification discloses an apparatus obtained by unifying an information processing apparatus and an operation device in the above (1) to (6). The information processing apparatus may include a processor, an inertial sensor, and a vibrator. The processor executes game processing, outputs a vibration control signal for vibrating the vibrator in a predetermined situation in the game processing, determines, based on an output of the inertial sensor, whether or not the information processing apparatus is moving, and at least under the condition that it is determined that the information processing apparatus is not moving, limits the vibration so that the vibrator is not vibrated or the vibration is weakened in the predetermined situation.

According to the above game system, storage medium, information processing apparatus, and game processing method, it is possible to reduce the possibility of the occurrence of a disadvantage due to the vibration of an operation device.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing examples of the conditions for limiting the vibration of the non-limiting controller, and the conditions for cancelling the limitation;

FIG. 13 is a flow chart showing an example of the flow of game program processing executed in the non-limiting game system.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
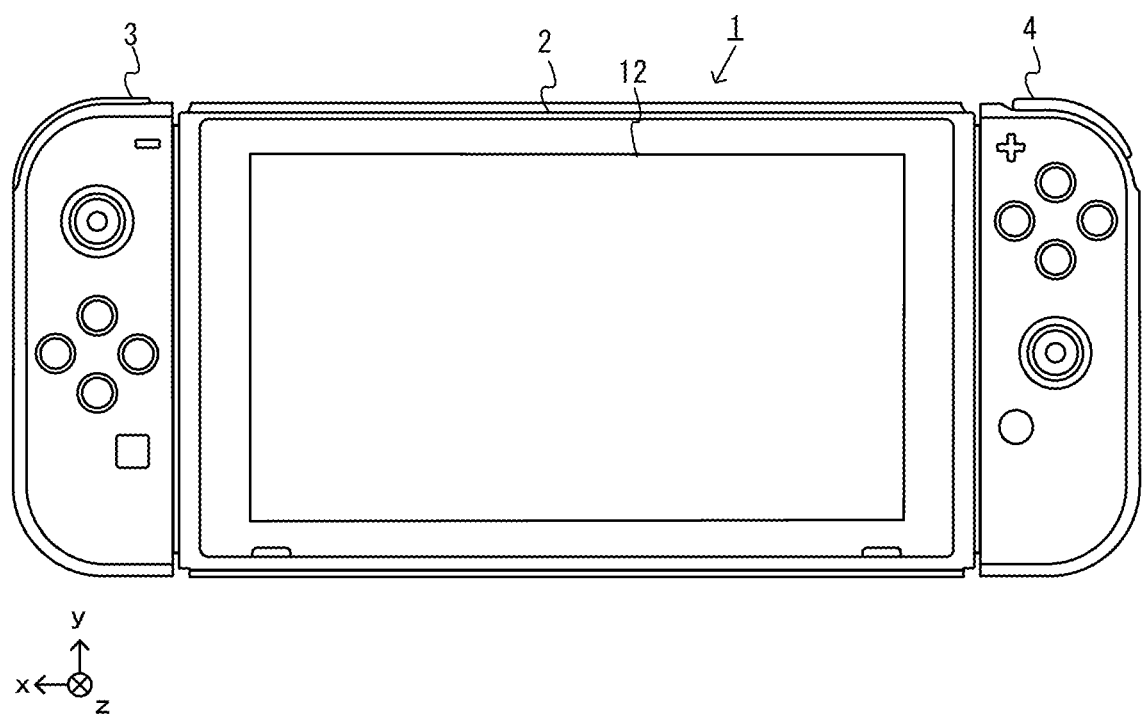
FIG. 1 is a diagram showing an example of the state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
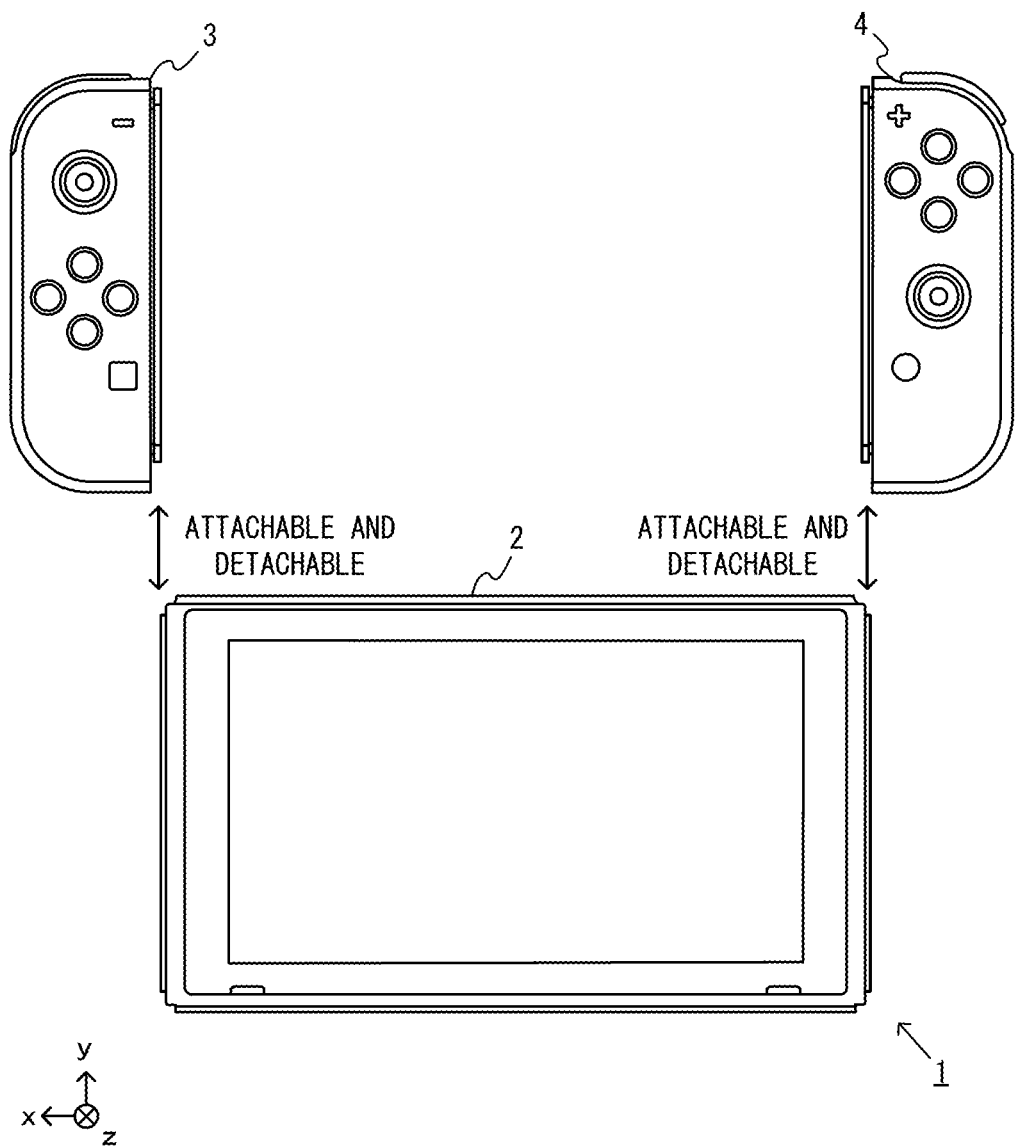
FIG. 2 is a diagram showing an example of the state where each of the non-limiting left controller and the non-limiting right controller is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
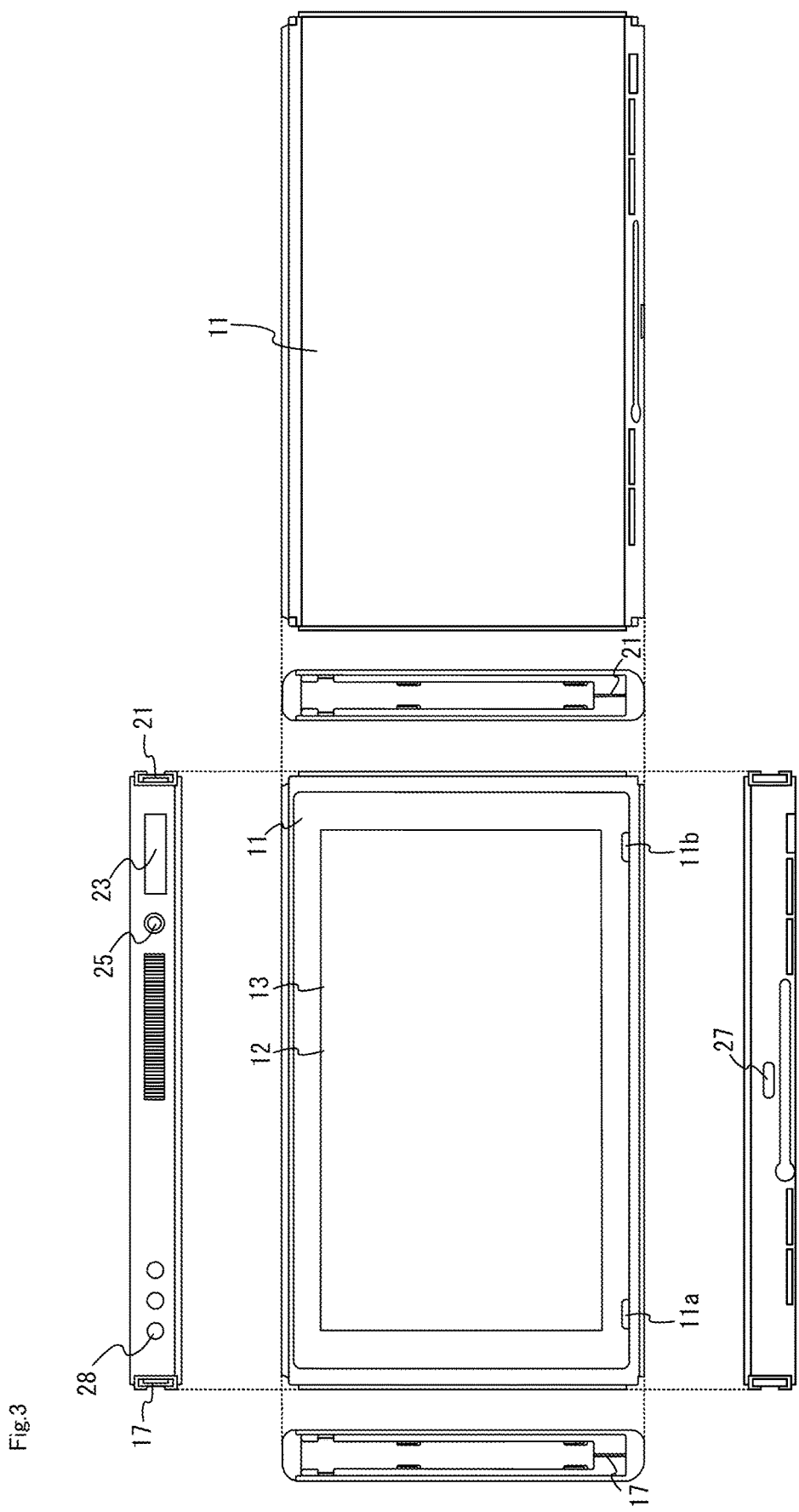
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
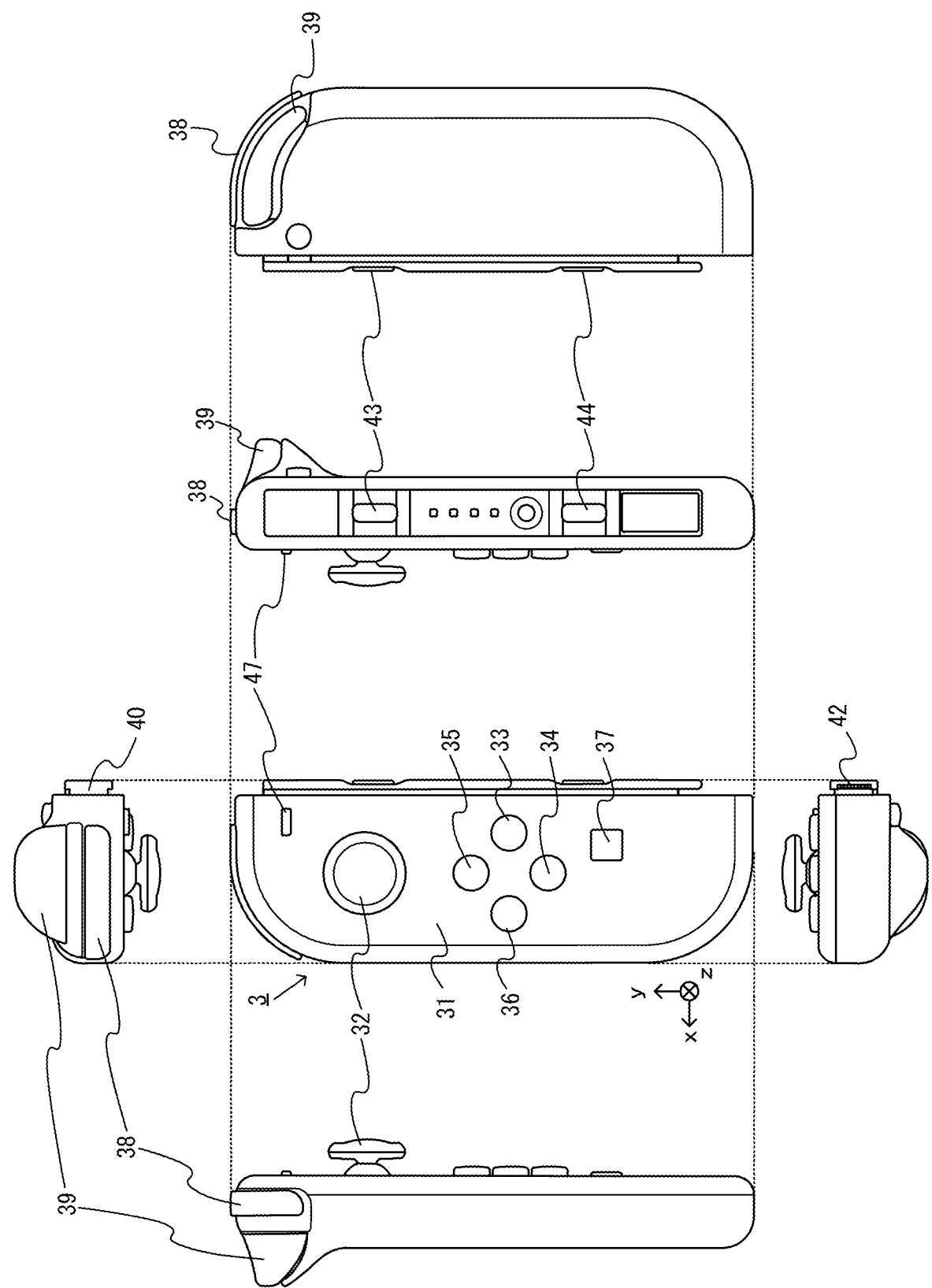
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
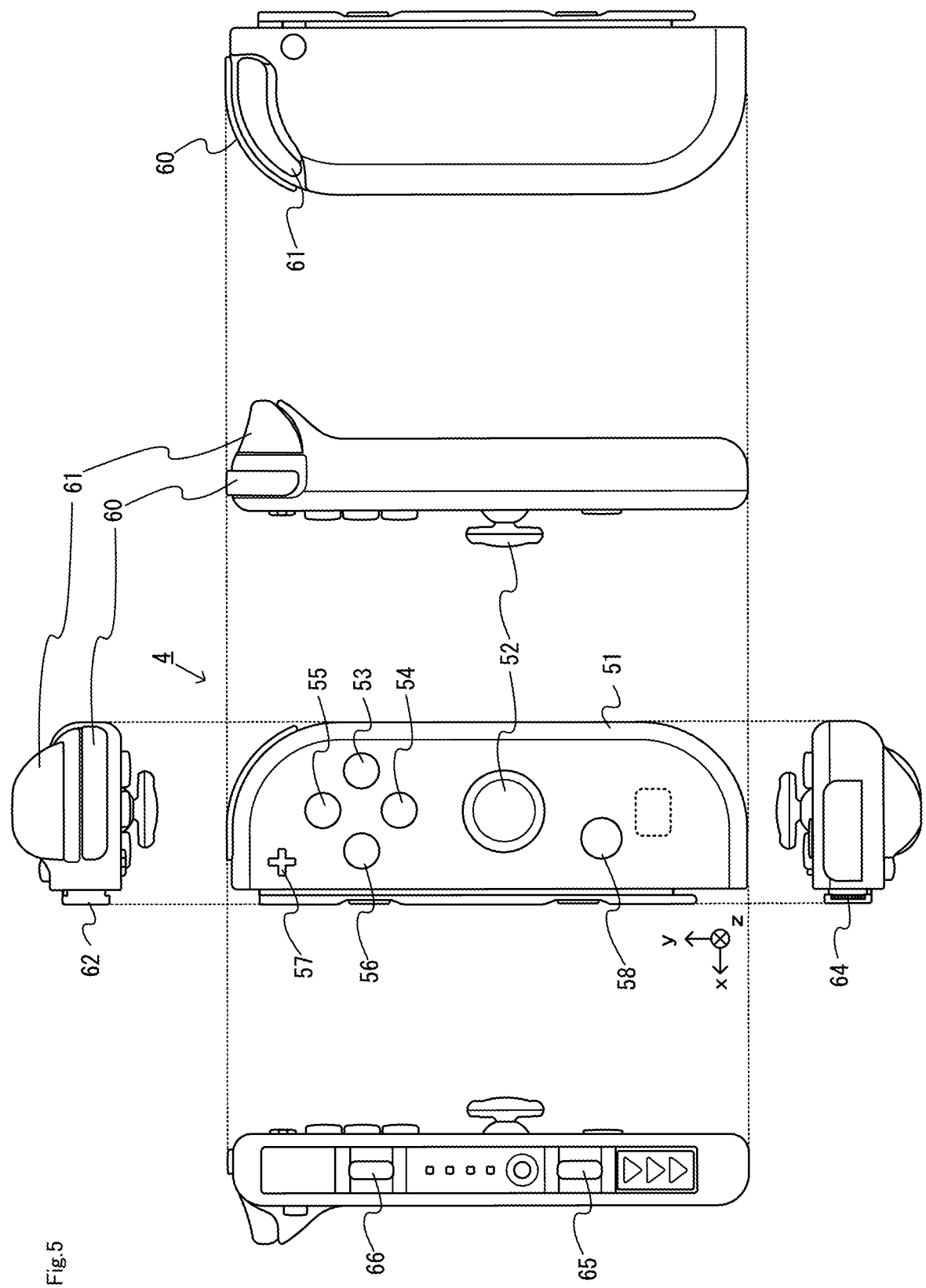
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
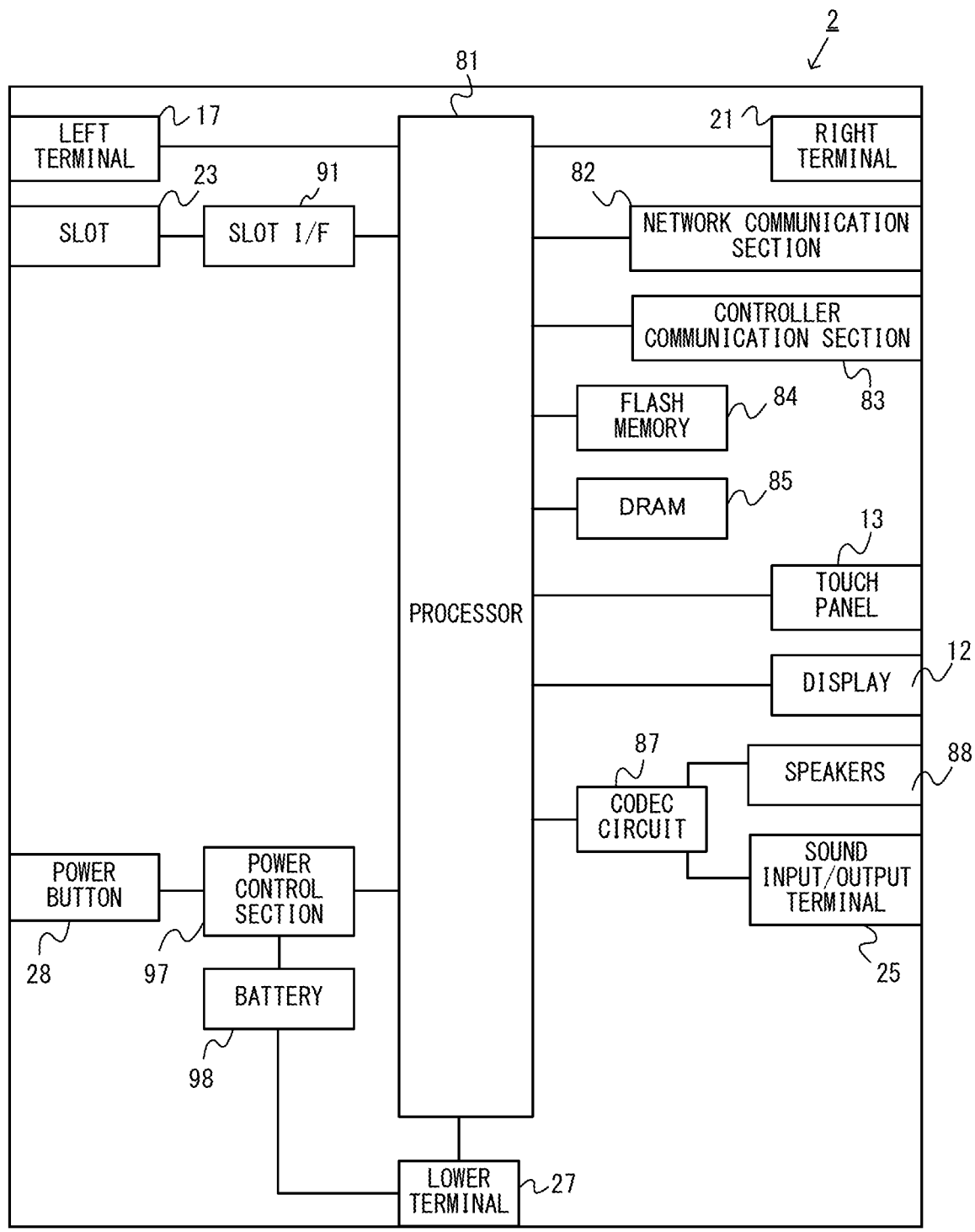
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
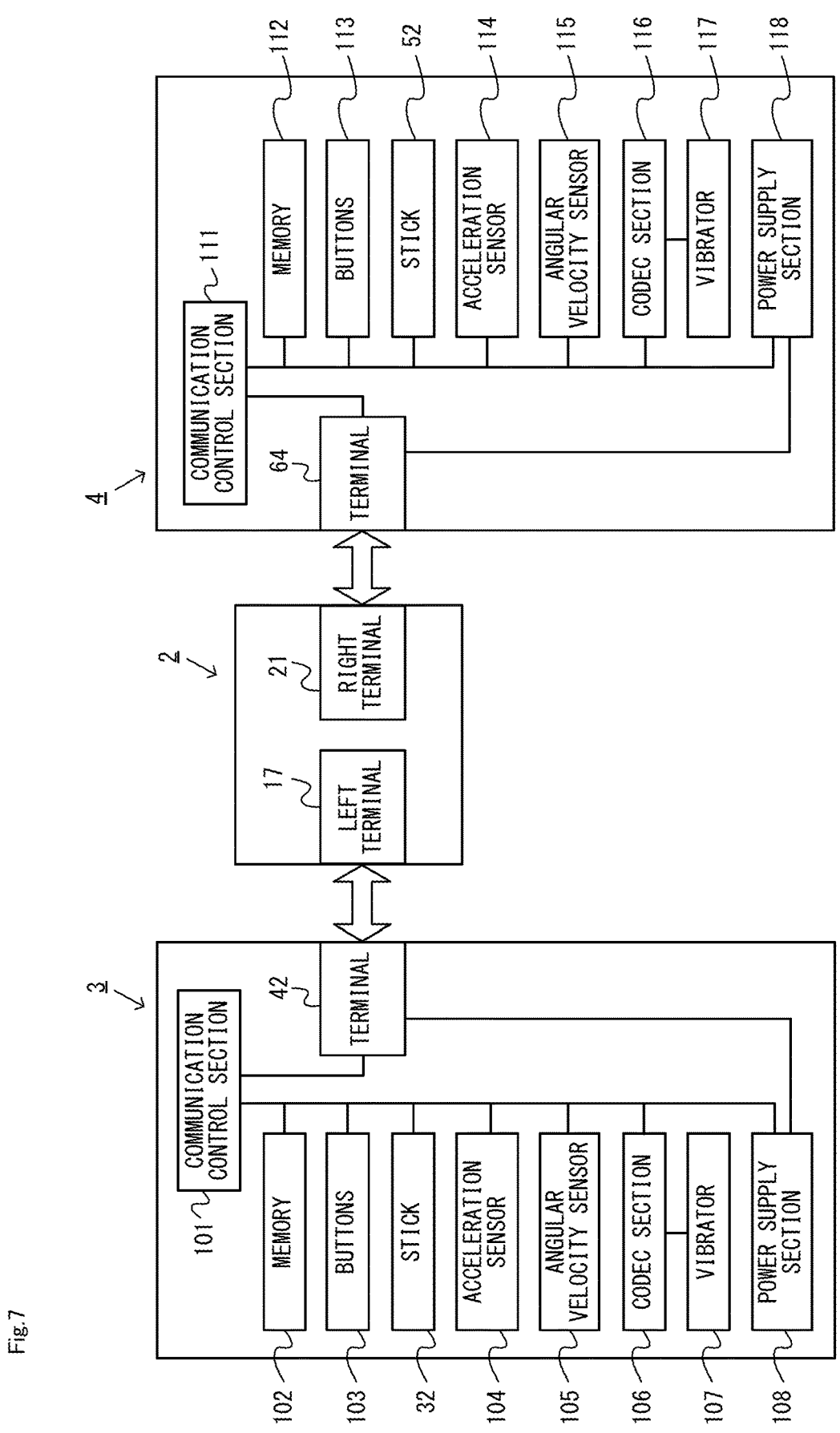
FIG. 7 is a block diagram showing an example of the internal configurations of the non-limiting main body apparatus and the non-limiting left and right controllers.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a vibration control signal from the main body apparatus 2. That is, if receiving the above vibration control signal from the main body apparatus 2, the communication control section 101 drives the vibrator 107 in accordance with the received vibration control signal. Here, the left controller 3 includes a codec section 106. If receiving the above vibration control signal, the communication control section 101 outputs a control signal corresponding to the vibration control signal to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a vibration control signal from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

[2. Overview of Processing in Game System]

With reference to FIGS. 8 to 11, a description is given of an overview of information processing executed in the game system 1. In the exemplary embodiment, in the game system 1, a game is executed where a controller vibrates at an appropriate timing during the game. In the exemplary embodiment, as an example, a case is described where a golf game is executed by a plurality of players (in other words, users). The genre and the content of the game executed in the game system 1 are optional, and the number of players participating in the game may be any number.

Figure 8:
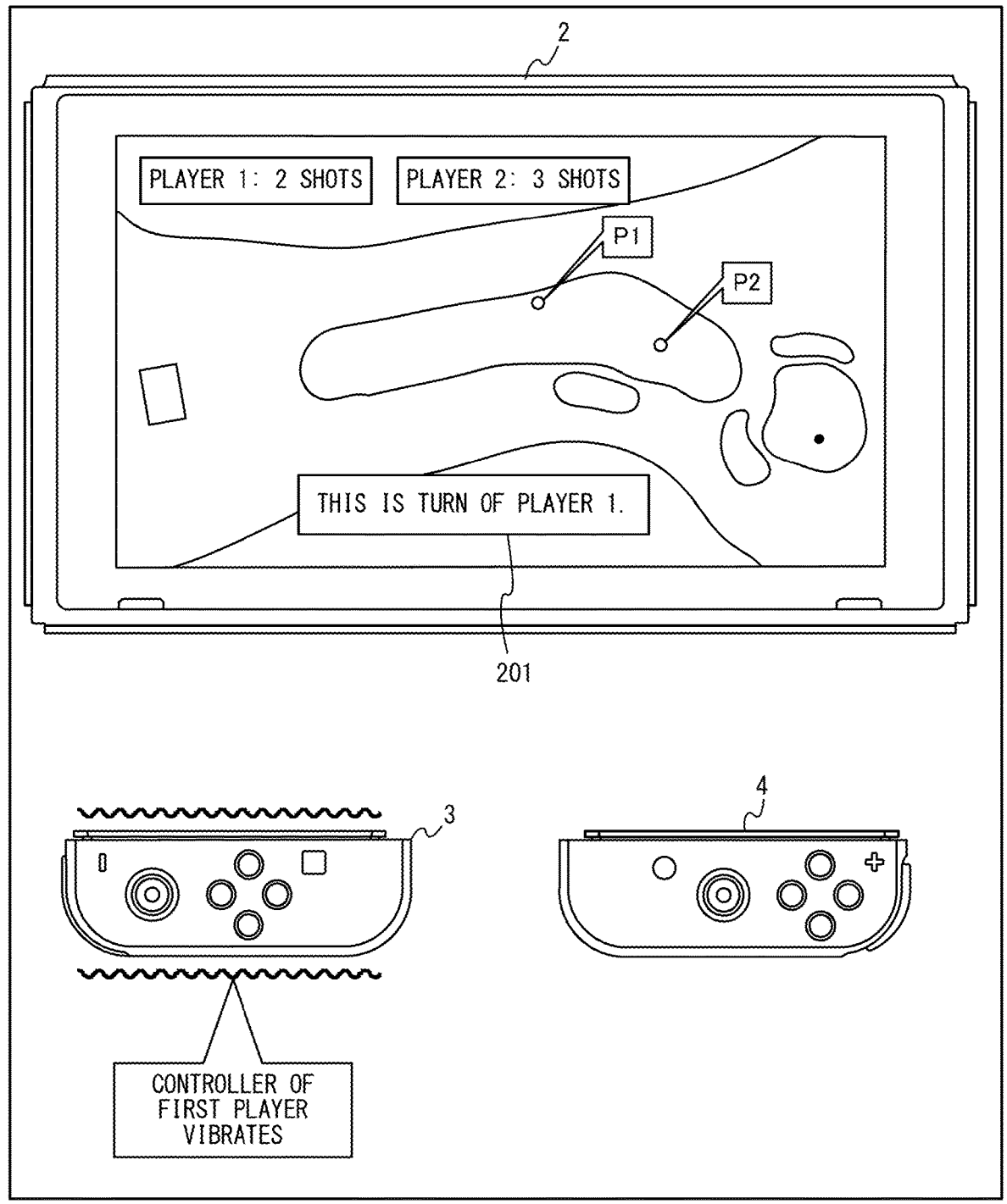
FIG. 8 is a diagram showing an example of the state where a non-limiting controller vibrates during a game.

FIG. 8 is a diagram showing an example of the state where a controller vibrates during the game. In the exemplary embodiment, two players perform the game, each using a single controller. Specifically, a first player performs the game using the left controller 3, and a second player performs the game using the right controller 4. At this time, the controllers 3 and 4 are used in the state where the controllers 3 and 4 are detached from the main body apparatus 2.

Although not shown in the figures, in the exemplary embodiment, each of the two players can also perform the game using the game system 1 (i.e., the main body apparatus 2 and the controllers 3 and 4). That is, game processing can also be executed by the first player using one game system 1, the second player using another game system 1, and two main body apparatuses 2 appropriately communicating with each other. At this time, the controllers 3 and 4 can be used in the state where the controllers 3 and 4 are detached from the main body apparatus 2, or can be used in the state of where the controllers 3 and 4 are attached to the main body apparatus 2.

[2-1. Vibration of Controller]

In the golf game, the game progresses by each of the players performing a shot operation (i.e., the operation of causing a player character to hit a shot) in order determined in the game (e.g., in descending order of the distance from a cup to a ball). Here, when a player has a turn performing a shot operation, to notify the player of their turn, the game system 1 vibrates a controller used by the player. For example, in the example shown in FIG. 8, the first player has a turn performing a shot operation. At this time, the game system 1 vibrates the left controller 3 associated with the first player. This enables the first player to recognize by the vibration that the first player themselves has a turn performing an operation. Although not shown in the figures, if the second player has a turn performing a shot operation during the game, the game system 1 vibrates the right controller 4 associated with the second player. In the example shown in FIG. 8, the display 12 of the main body apparatus 2 displays a message 201 indicating the turn of the first player ("player 1" in this game image). In another exemplary embodiment, however, a player may also be notified of their turn by the vibration alone, or by the vibration and a method other than the display (e.g., sound).

In the exemplary embodiment, a player and a controller used by the player are associated with each other at any timing. For example, at the start of the game, the main body apparatus 2 stores information in which the player and the controller are associated with each other. A specific method for associating the player and the controller is optional.

The form of the vibration (specifically, the intensity, the frequency, the pattern, and the like of the vibration) for the above notification is optional. For example, the game system 1 controls the controller to repeatedly generate a vibration for a predetermined time at regular intervals from when the game system 1 enters the state where the game system 1 receives the shot operation of the player to when the shot operation is started.

In the exemplary embodiment, also at another timing different from the timing when a player has a turn performing a shot operation, the game system 1 may vibrate a controller. For example, at the timing when a player character operated by a player hits a ball by a shot action, the game system 1 may vibrate a controller associated with the player. As described above, a vibration may be performed not only for the purpose of giving some notification to a player, but also for the purpose of enhancing the realistic feeling or the sense of immersion of the game. Hereinafter, the timing when a controller should be vibrated during the game will be referred to as a "vibration timing".

[2-2. Limitation of Control of Vibration]

As described above, in the exemplary embodiment, the game system 1 vibrates a controller during the game, but limits the vibration of the controller under a certain condition. That is, in the exemplary embodiment, even if the above vibration timing arrives, the game system 1 limits the vibration of a controller under a certain condition. With reference to FIG. 9, a description is given of the limitation of the vibration of a controller.

FIG. 9 is a diagram showing examples of conditions for limiting the vibration of a controller and conditions for cancelling the limitation. Here, in the exemplary embodiment, the game system 1 determines the state of the motion of a controller (the details of the determination method will be described below). If the state of the motion of the controller is the state where it is determined that the controller is moving (hereinafter referred to as a "moving state"), the vibration of the controller is permitted. That is, in the moving state, the game system 1 vibrates the controller in accordance with the arrival of the vibration timing. If, on the other hand, the state of the motion of the controller is the state where it is determined that the controller is not moving (hereinafter referred to as a "stopped state"), the vibration of the controller is limited (however, the limitation of the vibration may be cancelled as described below). That is, in the stopped state, even if the vibration timing arrives, the game system 1 does not vibrate the controller.

In the exemplary embodiment, if the game system 1 limits the vibration of a controller, the game system 1 does not vibrate the controller. In another exemplary embodiment, however, the game system 1 may weaken the vibration of a controller (as compared with a case where the vibration is not limited), thereby limiting the vibration. That is, "limiting the vibration" means that the controller is not vibrated and that the vibration is weakened as compared with a case where the vibration is not limited.

In the present specification, the state where it is determined that a controller is not moving is referred to as the "stopped state". This state, however, does not need to be the state where the controller is actually completely stopped. If the controller is not actually completely stopped, but is almost stopped, and as a result, the game system 1 determines that the controller is not moving, it is determined that the controller is in the above "stopped state".

Here, if it is determined that the state of the motion of a controller is the moving state, it can be presumed that it is likely that a player is holding the controller. Thus, in this case, the game system 1 vibrates the controller in accordance with the vibration timing and thereby can give a notification to the user or enhance the realistic feeling or the sense of immersion of the game by the vibration.

If, on the other hand, it is determined that the state of the motion of a controller is the stopped state, it can be presumed that it is likely that a player is not holding the controller, and the controller is placed on a table, a floor, or the like. In such a case, the player may have a feeling of discomfort based on the production of a loud sound due to the vibration of an operation device depending on the location where the operation device is placed. Further, in the above case, since the controller is not being held, the purpose of transmitting the vibration of the controller to the player is not achieved. Thus, power consumed by the vibration may go to waste. Thus, in the above case, the game system 1 limits the vibration of the controller. Consequently, it is possible to reduce the possibility of the occurrence of a disadvantage that a loud sound is produced due to a vibration, or power is consumed by an unnecessary vibration.

In the exemplary embodiment, even if it is determined that the state of the motion of a controller is the stopped state, but if a cancellation condition is satisfied, the game system 1 cancels the limitation of the vibration (see FIG. 9). That is, if the cancellation condition is satisfied, the game system 1 vibrates the controller even in the stopped state. In the exemplary embodiment, the cancellation condition includes the following three conditions, namely first to third cancellation conditions.

The first cancellation condition is that a controller is in the state where the controller is attached to the main body apparatus 2. If the controller is in such a state during the game, it can be presumed that a player is using a mobile apparatus obtained by unifying the main body apparatus 2 and a controller, while holding the mobile apparatus. Thus, if the first cancellation condition is satisfied, the game system 1 cancels the limitation of the vibration of the controller. As described above, if a controller is attached to the main body apparatus 2, the game system 1 cancels the limitation of vibration control and vibrates the controller in accordance with the vibration timing.

The second cancellation condition is that inputs are provided to the operation sections (specifically, the analog stick and the operation buttons) of a controller. If inputs are provided to the operation sections of the controller, it can be presumed that a player is holding the controller. Thus, if the second cancellation condition is satisfied, the game system 1 cancels the limitation of the vibration of the controller. As described above, if inputs are provided to the operation sections of a controller, the game system 1 cancels the limitation of vibration control and vibrates the controller in accordance with the vibration timing.

The third cancellation condition is that the orientation of a controller is not the orientation when the controller is placed on a table, a floor, or the like (hereinafter referred to as a "placement orientation"). Here, in the exemplary embodiment, if a controller is placed on a table, a floor, or the like, it is presumed that the controller is in the orientation in which the main surface of the housing is directed in the vertical up direction. That is, in the exemplary embodiment, the placement orientation is generally the orientation in which the main surface of the housing is directed in the vertical up direction (the details will be described below). If the orientation of the controller is not such a placement orientation, even if the controller is not moving, it can be presumed that the controller is being held by a player without being placed. Thus, if the third cancellation condition is satisfied, the game system 1 cancels the limitation of the vibration of the controller.

Although the details will be described below, the determination of whether or not the orientation of a controller is the placement orientation is made based on inertia data based on the outputs of inertial sensors (specifically, data based on the output of an acceleration sensor). That is, based on inertia data, the game system 1 determines whether or not the orientation of a controller satisfies the cancellation condition. If the cancellation condition is satisfied, the game system 1 cancels the limitation of vibration control.

As described above, in the exemplary embodiment, in a case where it is determined that the state of the motion of a controller is the stopped state, and if the cancellation condition is satisfied, the game system 1 cancels the limitation of the vibration. Based on this, if a player is holding a controller, it is possible to reduce the possibility that the vibration of the controller is limited.

If at least one of the above first to third cancellation conditions is satisfied, the game system 1 determines that the cancellation condition is satisfied, and cancels the limitation of the vibration. That is, in the stopped state, if at least one of the first to third cancellation conditions is satisfied, the limitation of the vibration is cancelled. If none of the first to third cancellation conditions is satisfied, the vibration is limited (see FIG. 9).

In the exemplary embodiment, in the period from when the cancellation condition is satisfied to when a predetermined cancellation continuation time (e.g., 0.5 s) elapses, the game system 1 cancels the limitation of the vibration. This is because immediately after it is determined that the cancellation condition is satisfied, similarly to the point in time when the cancellation condition is satisfied, it can be presumed that a player is holding the controller. Based on this, for example, it is possible to prevent a failure where immediately after a button input is provided to a controller, the vibration of the controller is suddenly stopped.

[2-3. Determination of State of Motion of Controller]

Figure 10:
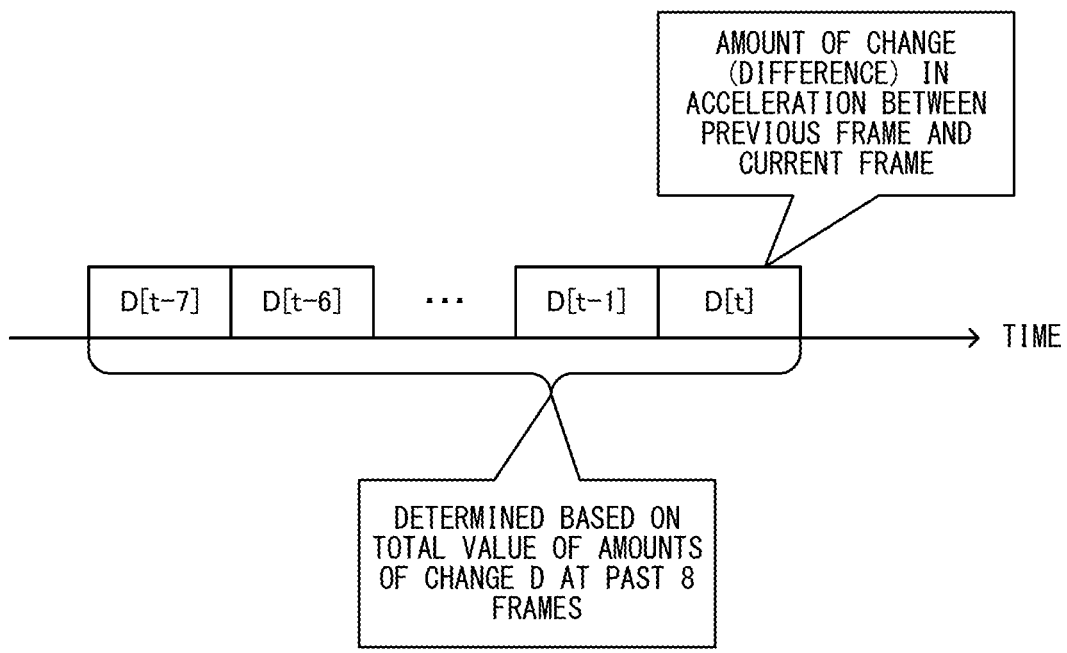
FIG. 10 is a diagram illustrating a method for determining the state of the motion of the non-limiting controller.

Next, with reference to FIG. 10, a description is given of a method for determining the state of the motion of a controller (i.e., whether the controller is in the moving state or the stopped state). In the exemplary embodiment, a controller enters either of the above moving state and stopped state. That is, the game system 1 identifies either of the moving state and the stopped state as the state of the current motion of the controller.

FIG. 10 is a diagram illustrating the method for determining the state of the motion of a controller. In the exemplary embodiment, based on an acceleration detected by the acceleration sensor of a controller, the game system 1 determines the state of the motion of the controller. First, based on the output of the acceleration sensor, the game system 1 calculates the acceleration of the controller every predetermined unit time (specifically, one frame time). Then, the game system 1 calculates the amount of change in the acceleration per unit time. In the exemplary embodiment, the amount of change is calculated as a difference D between the acceleration at the current frame and the acceleration at the previous frame. The difference D is obtained by, for example, calculating values obtained by subtracting the values of components (i.e., an x-axis component, a y-axis component, and a z-axis component) of the acceleration at the previous frame from the values of components of the acceleration at the current frame on a component-by-component basis and totaling the absolute values of the subtraction values of the respective components. Thus, if the acceleration at the current frame is A[t], and the acceleration at the previous frame is A[t−1], a difference D[t] at the current frame is calculated by the following formula (1).

$$D[t]=|Ax[t]-Ax[t-1]|+|Ay[t]-Ay[t-1]|+|Az[t]-Az[t-1]| \quad (1)$$

The game system 1 calculates the above difference D every unit time.

Next, the game system 1 calculates the total value of the differences D calculated in the period from the current frame to a predetermined difference calculation time (here, a time corresponding to eight frames) before. In the exemplary embodiment, the game system 1 calculates the total value of the differences at the most recent eight frames including the current frame (i.e., D[t], D[t−1], . . . , D[t−7]) (see FIG. 10). Then, based on the above total value, the game system 1 determines whether the controller is in the moving state or the stopped state. In the exemplary embodiment, if the controller is in the moving state, and if the total value falls below a predetermined lower limit threshold, the game system 1 changes the result of the determination as the motion of the controller from the moving state to the stopped state. If the controller is in the stopped state, and if the total value exceeds a predetermined upper limit threshold, the game system 1 changes the controller from the stopped state to the moving state. The upper limit threshold is set to a value greater than the lower limit threshold. This can reduce the possibility that the turning on and off of the vibration of the controller is frequently repeated by the frequent switching of the moving state and the stopped state.

As described above, in the exemplary embodiment, if the magnitude of a change in an acceleration detected by the acceleration sensor in a predetermined period (i.e., the period from the current moment to the difference calculation time before) is smaller than a reference, the game system 1 determines that the controller is not moving. Based on this, even if a controller is not completely stopped, but is substantially stopped, the game system 1 can determine that the controller is not moving. Here, if the vibration of a controller is limited only when the controller is completely stopped, there will be too few situations where the vibration is limited, and the vibration may not be able to be effectively limited. In contrast, according to the exemplary embodiment, if a controller is substantially stopped, the vibration of the controller can be limited. Thus, the vibration can be effectively limited. In the exemplary embodiment, the above "reference" is the above lower limit value or upper limit value. Thus, the value of the reference changes. In another exemplary embodiment, however, the above "reference" may be a fixed value.

The method for determining the state of the motion of a controller is optional. For example, in another exemplary embodiment, based on whether or not the magnitude of the current acceleration of a controller is greater than or equal to a threshold, the game system 1 may determine whether the controller is in the moving state or the stopped state. In another exemplary embodiment, based on an angular velocity detected by the angular velocity sensor together with (or instead of) an acceleration detected by the acceleration sensor, the game system 1 may make the above determination.

[2-4. Determination of Whether or not Orientation is Placement Orientation]

Figure 11:
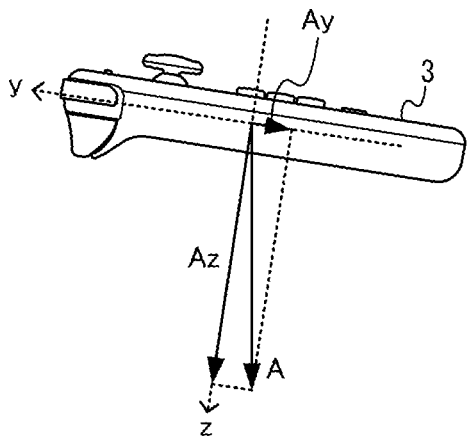
FIG. 11 is a diagram showing an example of a case where it is determined that the orientation of the non-limiting controller is a placement orientation, and an example of a case where it is determined that the orientation of the non-limiting controller is not the placement orientation.

Next, with reference to FIG. 11, a description is given of a method for determining whether or not the orientation of a controller is the placement orientation. Here, in the exemplary embodiment, the orientation when the main surface of the housing of a controller is directed in the vertical up direction (i.e., a straight line perpendicular to the main surface is parallel to the vertical up direction) is defined as a reference orientation, and the placement orientation refers to an orientation within a predetermined range from the reference orientation.

FIG. 11 is a diagram showing an example of a case where it is determined that the orientation of a controller is the placement orientation, and an example of a case where it is determined that the orientation of the controller is not the placement orientation. In FIG. 11, an acceleration vector A represents the acceleration of the controller detected by the acceleration sensor. In the examples shown in FIG. 11, the controller is stopped, and only a gravitational acceleration is applied to the controller.

In the exemplary embodiment, the game system 1 makes a determination based on the y-component Ay and the z-component Az of the above acceleration vector A. Here, as shown in FIG. 11, if a value obtained by doubling the y-component Ay of the acceleration vector A is less than or equal to the z-component Az ((a) of FIG. 11), the orientation of the controller is close to the reference orientation. If, on the other hand, the value obtained by doubling the y-component Ay of the acceleration vector A is greater than the z-component Az ((b) of FIG. 11), the orientation of the controller is far from the reference orientation. Thus, in the exemplary embodiment, in the first case, the game system 1 determines that the orientation of the controller is the placement orientation. In the second case, the game system 1 determines that the orientation of the controller is not the placement orientation. Although in the exemplary embodiment, the value obtained by doubling the y-component Ay of the acceleration vector A is used in the above determination, the value of a coefficient by which to multiply the y-component Ay is optional.

The method for determining whether or not the orientation of a controller is the placement orientation is optional. The determination may be made by another method. For example, in another exemplary embodiment, based on whether or not the angle between the acceleration vector A and the z-axis direction is less than or equal to a predetermined value, the game system 1 may determine whether or not the orientation of the controller is the placement orientation. In another exemplary embodiment, based on an angular velocity detected by the angular velocity sensor together with (or instead of) an acceleration detected by the acceleration sensor, the game system 1 may make the above determination. The inertial sensors used to determine whether or not the orientation of a controller is the placement orientation and the inertial sensors used to determine the state of the motion of the controller may be the same as or different from each other.

[3. Specific Example of Processing in Game System]

Figure 12:
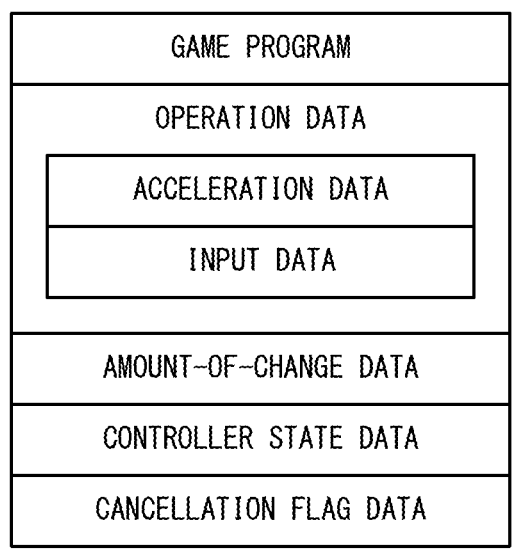
FIG. 12 is a diagram showing examples of various pieces of data used for information processing in a non-limiting game system.

Next, with reference to FIGS. 12 and 13, a description is given of a specific example of the information processing in the game system 1.

FIG. 12 is a diagram showing examples of various pieces of data used for the information processing in the game system 1. The various pieces of data shown in FIG. 12 are stored in a storage medium (e.g., the flash memory 84, the DRAM 85, a memory card attached to the slot 23, and/or the like) accessible by the main body apparatus 2.

As shown in FIG. 12, the game system 1 stores a game program. The game program is a game program for executing the game according to the exemplary embodiment (specifically, game program processing shown in FIG. 13). The game system 1 stores operation data, amount-of-change data, controller state data, and cancellation flag data.

As described above, the operation data is transmitted from each of the controllers 3 and 4 to the main body apparatus 2 and stored in the main body apparatus 2. In the exemplary embodiment, the operation data includes input data indicating inputs to the above operation sections, and acceleration data based on the output of the acceleration sensor of the controller. The amount-of-change data indicates the amount of change in an acceleration per unit time of a controller, and in the exemplary embodiment, indicates the above difference D. In the exemplary embodiment, the main body apparatus 2 saves, as the amount-of-change data, data indicating the difference D calculated at least in the period from the current time to the above difference calculation time before. The controller state data indicates the state of the motion of a controller, and in the exemplary embodiment, indicates either of the moving state and the stopped state. The cancellation flag data is data of a flag indicating whether or not the current state is the state where the limitation of the vibration is cancelled. Although not shown in the figures, the main body apparatus 2 stores each of the operation data, the amount-of-change data, the controller state data, and the cancellation flag data with respect to each controller used in the game.

FIG. 13 is a flow chart showing an example of the flow of game program processing executed in the game system 1. The game program processing shown in FIG. 13 is started in accordance with the fact that, for example, a player gives a predetermined game start instruction during the execution of the above game program.

In the exemplary embodiment, the description is given on the assumption that the processes of steps shown in FIG. 13 are executed by the processor 81 of the main body apparatus 2 executing the game program stored in the game system 1. In another exemplary embodiment, however, some of the processes of the above steps may be executed by a processor (e.g., a dedicated circuit or the like) different from the processor 81. Further, in a case where the game system 1 can communicate with another information processing apparatus (e.g., a server), some of the processes of the steps shown in FIG. 13 may be executed by the other information processing apparatus. The processes of all of the steps shown in FIG. 13 are merely illustrative. Thus, the processing order of the steps may be changed, or another process may be performed in addition to (or instead of) the processes of all of the steps, so long as similar results are obtained.

The processor 81 executes the processes of the steps shown in FIG. 13, using a memory (e.g., the DRAM 85). That is, the processor 81 stores information (in other words, data) obtained by each processing step in the memory. To use the information in the subsequent processing steps, the processor 81 reads the information from the memory and uses the read information.

In step S1 shown in FIG. 13, the processor 81 acquires operation data from each controller. That is, the processor 81 acquires operation data received from each controller via the controller communication section 83 and/or the terminals 17 and 21 and stores the operation data in the memory. After step S1, the process of step S2 is executed.

In step S2, the processor 81 executes game processing for advancing the game. For example, in accordance with an input provided by the player (i.e., based on the operation data acquired in step S1), the processor 81 executes the process of causing a player character to perform an action in a virtual game space, or the process of causing an object (e.g., a ball) to perform an action in the game space. The processor 81 generates a game image representing the game space and displays the game image on the display 12. In the exemplary embodiment, the process of step S2 is executed repeatedly, once every predetermined frame time. After step S2, the process of step S3 is executed.

In step S3, the processor 81 determines the state of the motion of the controller. Specifically, in accordance with the method described in the above "[2-3. Determination of State of Motion of Controller]", and based on the acceleration data acquired in step S1, the processor 81 determines whether the controller is in the moving state or the stopped state. At this time, the processor 81 stores data indicating the calculated current difference D as amount-of-change data in the memory. The processor 81 stores data indicating the determined state as controller state data in the memory. In the period from when the game program processing shown in FIG. 13 is started to when the described difference calculation time elapses, the determination cannot be made by the above method. Thus, in this period, the state of the motion of the controller is set to one of the moving state and the stopped state determined in advance by the game program. After step S3, the process of step S4 is executed.

In step S4, the processor 81 determines whether or not the vibration timing arrives. The determination in step S4 is made based on the game situation resulting from the advancement in the process of step S2. For example, if any of players participating in the game enters the state where the player performs a shot operation, or if a player character hits a ball, the processor 81 determines that the vibration timing arrives. If the result of the determination in step S4 is affirmative, the process of step S5 is executed. If, on the other hand, the result of the determination in step S4 is negative, the series of processes of steps S5 to S9 is skipped, and the process of step S10 described below is executed.

In step S5, based on the controller state data stored in the memory, the processor 81 determines whether or not the state of the motion of the controller is the stopped state. If the result of the determination in step S5 is affirmative, the process of step S6 is executed. If, on the other hand, the result of the determination in step S5 is negative, the process of step S9 described below is executed.

In step S6, the processor 81 determines whether or not the cancellation condition is satisfied. That is, the processor 81 determines whether or not any of the above first to third cancellation conditions is satisfied. The determination regarding the first cancellation condition is made based on the communication state between the controller and the main body apparatus 2 (i.e., whether the communication is wireless communication or wired communication). The determination regarding the second cancellation condition is made based on the input data acquired in step S1. The determination regarding the third cancellation condition is made in accordance with the method described in the above "[2-4. Determination of Whether or not Orientation Is Placement Orientation]" and based on the acceleration data acquired in step S1. If the result of the determination in step S6 is affirmative, the process of step S7 is executed. If, on the other hand, the result of the determination in step S6 is negative, the process of step S8 is executed.

In step S7, the processor 81 cancels the limitation of the vibration of the controller. Specifically, the processor 81 updates a cancellation flag data stored in the memory to a content indicating an on state (i.e., the state where the limitation of the vibration is cancelled). In the exemplary embodiment, if the above cancellation continuation time elapses since the result of the determination is affirmative in step S6 for the last time, the processor 81 updates the cancellation flag data to indicate an off state (i.e., the state where the limitation of the vibration is not cancelled). After step S7, the process of step S9 is executed.

In step S8, the processor 81 determines whether or not the current time is in a cancellation continuation period. That is, the processor 81 determines whether or not the cancellation flag data stored in the memory indicates the on state. If the result of the determination in step S8 is affirmative, the process of step S9 is executed. If, on the other hand, the result of the determination in step S8 is negative, the process of step S10 is executed.

As described above, in the exemplary embodiment, if it is determined that the state of the motion of the controller is the stopped state (Yes in step S5), and the cancellation condition is not satisfied, and the current time is not the cancellation continuation period (No in steps S6 and S8), the process of controlling the vibration (step S9) is not executed. That is, control of the vibration is limited.

In step S9, the processor 81 controls the vibration of the controller. Specifically, the processor 81 generates the above vibration control signal for vibrating the vibrator of the specified controller and causes the controller communication section 83 to perform the operation of transmitting the vibration control signal to the controller. The controller having received the vibration control signal (specifically, the communication control section) outputs a control signal corresponding to the vibration control signal to an amplifier, thereby vibrating the vibrator. Consequently, the vibrator vibrates in a vibration form specified by the vibration control signal, and the controller vibrates. After step S9, the process of step S10 is executed.

In step S10, the processor 81 determines whether or not the game is to be ended. Specifically, if a predetermined ending condition (e.g., the fact that play in a predetermined number of golf courses ends) is satisfied, or if an instruction to end the game is given by the player, the processor 81 determines that the game is to be ended. If the result of the determination in step S10 is negative, the process of step S1 is executed again. From this time onward, the series of processes of steps S1 to S10 is repeatedly executed until it is determined in step S10 that the game is to be ended. If, on the other hand, the result of the determination in step S10 is affirmative, the processor 81 ends the game program processing shown in FIG. 13.

[4. Effects and Variations of Above Exemplary Embodiment]

In the above exemplary embodiment, the game system 1 includes an information processing apparatus (e.g., the main body apparatus 2) and at least one operation device (e.g., controller). The information processing apparatus includes a processor, and the operation device includes an inertial sensor (e.g., an acceleration sensor) and a vibrator. The operation device transmits inertia data (e.g., acceleration data) based on the output of the inertial sensor to the information processing apparatus and vibrates the vibrator based on a vibration control signal received from the information processing apparatus. The processor (a) executes game processing (e.g., step S2), (b) in a predetermined situation in game processing, causes a vibration control signal for vibrating the vibrator of the specified operation device to be output from the information processing apparatus (e.g., step S9), (c) based on inertia data from the operation device, determines whether or not the operation device is moving (e.g., steps S3 and S5), and (d) at least under the condition that it is determined that the operation device is not moving, limits the vibration so that the vibrator of the operation device is not vibrated (or the vibration is weakened) in the predetermined situation (e.g., the process of step S9 is skipped at least under the condition that the determination is Yes in step S5).

Based on the above, if it is presumed that the operation device is placed without being held by a player, it is possible to limit the vibration of the operation device. Consequently, it is possible to reduce the possibility of the occurrence of a disadvantage that a loud sound is produced due to the vibration of a controller placed on a table or a floor, or power is consumed by an unnecessary vibration.

The above "inertia data based on the outputs of inertial sensors" may be data itself output from the inertial sensors, or data obtained by performing some process (e.g., the process of converting the data format, a calculation process, or the like) on data output from the inertial sensors.

The above "predetermined situation" may be any situation during the game. In the above exemplary embodiment, the processor executes a game (e.g., a golf game) where a plurality of players perform game operations in order in game processing. Then, as the predetermined situation, in a situation where a player has a turn performing a game operation, vibration control is performed. Specifically, at least under the condition that it is determined that in the above situation, an operation device corresponding to the player is moving, the processor 81 outputs from the information processing apparatus a vibration control signal for vibrating the vibrator of the operation device (FIG. 8), and at least under the condition that it is determined that the operation device is not moving, limits vibration control. Based on the above, if a player having a turn performing an operation is holding an operation device during a multiplay game, it is possible to give a notification to the player by a vibration, and also, if the player is not holding the operation device, it is possible to reduce the possibility of the occurrence of a disadvantage due to a vibration.

The game executed by the game system 1 may be not only a multiplay game in which a plurality of players participate, but also a game executed by a single player. In the game executed by a single player, the above "predetermined situation" is, for example, a situation where a controller vibrates in accordance with the content of a moving image in the period when a moving image is reproduced during the game (e.g., a situation where the controller vibrates in accordance with an explosion scene). In the period when the moving image is reproduced as described above, there is a possibility that the player places the controller on a table or a floor. Thus, the above exemplary embodiment is applied in a situation as described above, it is possible to achieve effects similar to those of the above exemplary embodiment.

(Variations Regarding Limitation of Vibration)

In the above exemplary embodiment, in a case where it is determined that a controller is not moving, and if the cancellation condition is satisfied, the limitation of the vibration is cancelled. Here, in another exemplary embodiment, the cancellation condition may not be set, and if it is determined that the controller is not moving, the vibration of the controller may be limited. At this time, if it is determined that the controller is not moving, and if a predetermined easing condition is satisfied, the game system 1 may weaken the vibration of the controller as compared with a case where the vibration is not limited. If the easing condition is not satisfied, the game system 1 may not vibrate the controller. That is, in a case where it is determined that the controller is not moving, the game system 1 may vary a method for limiting the vibration (i.e., whether the vibration is to be stopped or weakened) based on whether or not a condition is satisfied.

As the above easing condition, a condition opposite to the above cancellation condition may be used. For example, the condition that "the orientation of the controller is the placement orientation", which is a condition opposite to the above third cancellation condition, may be used as the easing condition. Here, if it is determined that a controller is not moving, and if it is determined that the orientation of the controller is the above placement orientation, it can be estimated that it is likely that the controller is placed on a table or a floor, but it is also possible that the controller is being held by a player in the orientation in which the controller is in the placement orientation. Thus, in a case where it is determined that a controller is not moving, and if it is determined that the orientation of the controller is the above placement orientation, the game system 1 may weaken the vibration of the controller. Based on this, the vibration of the controller is weakened. Thus, even if the controller is actually placed, it is possible to reduce the possibility of the occurrence of a disadvantage due to a vibration. Further, even if the controller is actually being held by a player, it is possible to transmit a vibration to the player. In a case where it is determined that a controller is not moving, and if the easing condition is not satisfied (i.e., if it is determined that the orientation of the controller is not the placement orientation), the game system 1 does not vibrate the controller, whereby it is possible to certainly reduce the possibility of the occurrence of a disadvantage due to a vibration.

In another exemplary embodiment, the game system 1 may use both the cancellation condition and the easing condition. For example, in a case where it is determined that a controller is not moving, the game system 1 (a) may cancel the limitation of the vibration if the above first cancellation condition (i.e., a controller is in the state where the controller is attached to the main body apparatus 2) is satisfied, (b) may weaken the vibration if the above easing condition is satisfied, and (c) may not vibrate the controller if neither the first cancellation condition and the above easing condition is satisfied.

In another exemplary embodiment, in accordance with the type of vibration, the game system 1 may switch whether or not to limit the vibration. For example, regarding a first type of vibration for the purpose of enhancing the realistic feeling or the sense of immersion of the game, if a condition is satisfied, the game system 1 may limit the vibration. On the other hand, regarding a second type of vibration for the purpose of giving a notification to a player, even if the condition is satisfied, the game system 1 may not limit the vibration. The first type of vibration is, for example, a vibration corresponding to a sound effect in the game, or a vibration corresponding to the action of a game object. The second type of vibration is, for example, a vibration for notifying a player that the player has a turn operating an operation, or a vibration for notifying a player of the location of a controller (when the player loses sight of the controller). Consequently, it is possible to reduce the possibility of the occurrence of a disadvantage due to a vibration and also certainly give a notification to a player.

(Variations Regarding Condition for Limiting Vibration)

In the above exemplary embodiment, at least under the condition that it is determined that a controller is not moving, the vibration of the controller is limited. Here, in another exemplary embodiment, regardless of whether or not a controller is moving, at least under the condition that it is determined that the controller is not in the above placement orientation, the game system 1 may limit the vibration of the controller. As described above, based on inertia data, the game system 1 may determine whether or not the orientation of a controller satisfies a predetermined condition, and at least under the condition that the predetermined condition is satisfied, may limit the vibration of the controller. At this time, the game system 1 may use "the determination that the controller is moving" as the cancellation condition.

(Variations Regarding Configuration of Game System)

In the above exemplary embodiment, the game system 1 includes the main body apparatus 2 and a controller attachable to and detachable from the main body apparatus 2. In another exemplary embodiment, the game system may include a single apparatus. For example, the game system may be an information processing apparatus obtained by unifying the main body apparatus 2 and the controllers 3 and 4, and may be a mobile information processing apparatus including an inertial sensor and a vibrator. At this time, the above first cancellation condition is not used.

The above exemplary embodiment can be used for, for example, a game system and a game program in order, for example, to reduce the possibility of the occurrence of a disadvantage due to the vibration of an operation device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising:
   an information processing apparatus; and
   at least one operation device, wherein
   the information processing apparatus includes one or more processors,
   the at least one operation device includes an inertial sensor and a vibrator and is configured to:
   transmit inertia data based on an output of the inertial sensor to the information processing apparatus; and
   vibrate the vibrator based on a vibration control signal received from the information processing apparatus,
   the one or more processors are configured to:
   execute game processing;
   in a predetermined situation in the game processing, cause the vibration control signal to be output from the information processing apparatus;
   based on the inertia data from the at least one operation device, determine whether or not the at least one operation device is moving;

at least under the condition that it is determined that the at least one operation device is not moving, limit a vibration so that the vibrator of the at least one operation device is not vibrated or the vibration is weakened in the predetermined situation; and based on the inertia data, determine whether or not an orientation of the at least one operation device satisfies a cancellation condition, including (a) determining that the orientation of the at least one operation device satisfies the cancellation condition and (b) cancelling the limit of the vibration, when the orientation of the at least one operation device is an orientation different from a placement orientation.

2. The game system according to claim 1, wherein
the inertial sensor includes at least an acceleration sensor, and
if a magnitude of a change in an acceleration detected by the acceleration sensor in a predetermined period is smaller than a reference, the one or more processors determine that the at least one operation device is not moving.

3. The game system according to claim 1, wherein
the at least one operation device further includes an operation button and/or a direction input stick, and
if an input is provided to the operation button and/or the direction input stick, the one or more processors further cancel the limitation of the vibration.

4. The game system according to claim 1, wherein
the one or more processors:
execute a game where a plurality of players perform game operations in order in the game processing; and
in a situation where a player has a turn performing a game operation, at least under the condition that it is determined that the at least one operation device corresponding to the player is moving, cause the vibration control signal to be output from the information processing apparatus, and at least under the condition that it is determined that the at least one operation device is not moving, limit the vibration.

5. A game system comprising:
an information processing apparatus; and
at least one operation device, wherein
the information processing apparatus includes one or more processors,
the at least one operation device includes an inertial sensor and a vibrator and is configured to:
 transmit inertia data based on an output of the inertial sensor to the information processing apparatus; and
 vibrate the vibrator based on a vibration control signal received from the information processing apparatus,
the one or more processors are configured to:
 execute game processing;
 in a predetermined situation in the game processing, cause the vibration control signal to be output from the information processing apparatus;
 based on the inertia data from the at least one operation device, determine whether or not the at least one operation device is moving;
 at least under the condition that it is determined that the at least one operation device is not moving, limit a vibration so that the vibrator of the at least one operation device is not vibrated or the vibration is weakened in the predetermined situation; and wherein
the at least one operation device is attachable to the information processing apparatus, and
if the at least one operation device is in a state where the at least one operation device is attached to the information processing apparatus, the one or more processors further cancel the limitation of the vibration.

6. The game system according to claim 5, wherein
the at least one operation device further includes an operation button and/or a direction input stick, and
if an input is provided to the operation button and/or the direction input stick, the one or more processors further cancel the limitation of the vibration.

7. The game system according to claim 5, wherein
the one or more processors:
execute a game where a plurality of players perform game operations in order in the game processing; and
in a situation where a player has a turn performing a game operation, at least under the condition that it is determined that the at least one operation device corresponding to the player is moving, cause the vibration control signal to be output from the information processing apparatus, and at least under the condition that it is determined that the at least one operation device is not moving, limit the vibration.

8. A non-transitory computer-readable storage medium having stored therein a game program causing one or more processors of an information processing apparatus to:
communicate with an operation device including an inertial sensor and a vibrator and configured to transmit inertia data based on an output of the inertial sensor to the information processing apparatus and vibrate the vibrator based on a vibration control signal received from the information processing apparatus;
execute game processing;
in a predetermined situation in the game processing, cause the vibration control signal to be output from the information processing apparatus;
based on the inertia data from the operation device, determine whether or not the operation device is moving;
at least under the condition that it is determined that the operation device is not moving, limit a vibration so that the vibrator of the operation device is not vibrated or the vibration is weakened in the predetermined situation; and
based on the inertia data, determine whether or not an orientation of the at least one operation device satisfies a cancellation condition, including (a) determining that the orientation of the at least one operation device satisfies the cancellation condition and (b) cancelling the limit of the vibration, when the orientation of the at least one operation device is an orientation different from a placement orientation.

9. The non-transitory computer readable storage medium according to claim 8, wherein
the inertial sensor includes at least an acceleration sensor, and
the game program causes the computer to,
 if a magnitude of a change in an acceleration detected by the acceleration sensor in a predetermined period is smaller than a reference, determine that the operation device is not moving.

10. The non-transitory computer readable storage medium according to claim 8, wherein
the operation device further includes an operation button and/or a direction input stick, and the game program causes the computer to, if an input is provided to the operation button and/or the direction input stick, cancel the limitation of the vibration.

11. The non-transitory computer readable storage medium according to claim 8, wherein
the operation device is attachable to the information processing apparatus, and
the game program causes the computer to
if the operation device is in a state where the operation device is attached to the information processing apparatus, cancel the limitation of the vibration.

12. The non-transitory computer readable storage medium according to claim 8, wherein
the game program causes the computer to:
execute a game where a plurality of players perform game operations in order in the game processing; and
in a situation where a player has a turn performing a game operation, at least under the condition that it is determined that the operation device corresponding to the player is moving, cause the vibration control signal for vibrating the vibrator of the operation device to be output from the information processing apparatus, and at least under the condition that it is determined that the operation device is not moving, limit the vibration.

13. An information processing apparatus comprising one or more processors configured to:
communicate with an operation device including an inertial sensor and a vibrator and configured to transmit inertia data based on an output of the inertial sensor to the information processing apparatus and vibrate the vibrator based on a vibration control signal received from the information processing apparatus;
execute game processing;
in a predetermined situation in the game processing, cause the vibration control signal to be output from the information processing apparatus;
based on the inertia data from the operation device, determine whether or not the operation device is moving; and
at least under the condition that it is determined that the operation device is not moving, limit a vibration so that the vibrator of the operation device is not vibrated or the vibration is weakened in the predetermined situation; and
based on the inertia data, determine whether or not an orientation of the at least one operation device satisfies a cancellation condition, including (a) determining that the orientation of the at least one operation device satisfies the cancellation condition and (b) cancelling the limit of the vibration, when the orientation of the at least one operation device is an orientation different from a placement orientation.

14. The information processing apparatus according to claim 13, wherein
the inertial sensor includes at least an acceleration sensor, and
if a magnitude of a change in an acceleration detected by the acceleration sensor in a predetermined period is smaller than a reference, the one or more processors determine that the operation device is not moving.

15. The information processing apparatus according to claim 13, wherein
the operation device further includes an operation button and/or a direction input stick, and
if an input is provided to the operation button and/or the direction input stick, the one or more processors further cancel the limitation of the vibration.

16. The information processing apparatus according to claim 13, wherein
the operation device is attachable to the information processing apparatus, and
if the operation device is in a state where the operation device is attached to the information processing apparatus, the one or more processors further cancel the limitation of the vibration.

17. The information processing apparatus according to claim 13, wherein
the one or more processors:
execute a game where a plurality of players perform game operations in order in the game processing; and
in a situation where a player has a turn performing a game operation, at least under the condition that it is determined that the operation device corresponding to the player is moving, cause the vibration control signal to be output from the information processing apparatus, and at least under the condition that it is determined that the operation device is not moving, limit the vibration.

18. A game processing method executed in a game system including an information processing apparatus and at least one operation device including an inertial sensor and a vibrator, wherein
the at least one operation device is configured to
transmit inertia data based on an output of the inertial sensor to the information processing apparatus,
the information processing apparatus is configured to:
execute game processing; and
in a predetermined situation in the game processing, output a vibration control signal for vibrating the vibrator of the at least one operation device,
the at least one operation device is configured to
vibrate the vibrator based on the vibration control signal received from the information processing apparatus, and
the information processing apparatus is configured to:
based on the inertia data from the at least one operation device, determine whether or not the at least one operation device is moving;
at least under the condition that it is determined that the at least one operation device is not moving, limit a vibration so that the vibrator of the at least one operation device is not vibrated or the vibration is weakened in the predetermined situation; and
based on the inertia data, determine whether or not an orientation of the at least one operation device satisfies a cancellation condition, including (a) determining that the orientation of the at least one operation device satisfies the cancellation condition and (b) cancelling the limit of the vibration, when the orientation of the at least one operation device is an orientation different from a placement orientation.

19. The game processing method according to claim 18, wherein
the inertial sensor includes at least an acceleration sensor, and
if a magnitude of a change in an acceleration detected by the acceleration sensor in a predetermined period is smaller than a reference, the information processing apparatus determines that the at least one operation device is not moving.

20. The game processing method according to claim 18, wherein
the at least one operation device further includes an operation button and/or a direction input stick, and
if an input is provided to the operation button and/or the direction input stick, the information processing apparatus further cancels the limitation of the vibration.

21. The game processing method according to claim 18, wherein
the at least one operation device is attachable to the information processing apparatus, and
if the at least one operation device is in a state where the at least one operation device is attached to the information processing apparatus, the information processing apparatus further cancels the limitation of the vibration.

22. The game processing method according to claim 18, wherein
the information processing apparatus:
executes a game where a plurality of players perform game operations in order in the game processing; and
in a situation where a player has a turn performing a game operation, at least under the condition that it is determined that the at least one operation device corresponding to the player is moving, outputs the vibration control signal and at least under the condition that it is determined that the at least one operation device is not moving, limits the vibration.

23. An information processing apparatus comprising one or more processors, an inertial sensor, and a vibrator, wherein
the one or more processors are configured to:
execute game processing;
in a predetermined situation in the game processing, vibrate the vibrator;
based on an output of the inertial sensor, determine whether or not the information processing apparatus is moving;
at least under the condition that it is determined that the information processing apparatus is not moving, limit a vibration so that the vibrator is not vibrated or the vibration is weakened in the predetermined situation; and
based on the inertia data, determine whether or not an orientation of the information processing device satisfies a cancellation condition, including (a) determining that the orientation of the information processing device satisfies the cancellation condition and (b) cancelling the limit of the vibration, when the orientation of the information processing device is an orientation different from a placement orientation.

24. The game system according to claim 5, wherein
the inertial sensor includes at least an acceleration sensor, and
if a magnitude of a change in an acceleration detected by the acceleration sensor in a predetermined period is smaller than a reference, the one or more processors determine that the at least one operation device is not moving.

* * * * *